No. 807,135. PATENTED DEC. 12, 1905.
J. P. SMITH.
SNAG HOOK.
APPLICATION FILED AUG. 24, 1905.
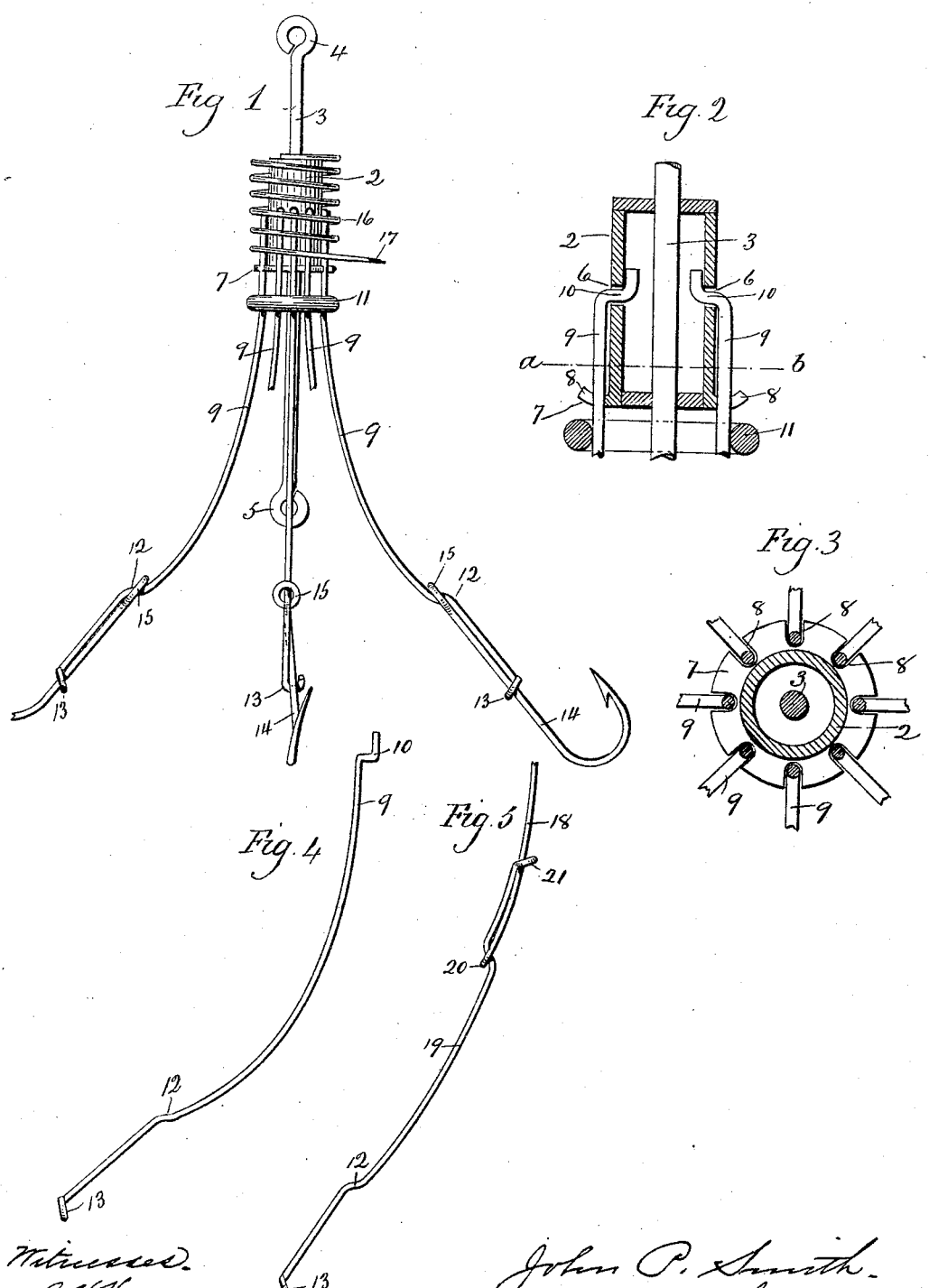

UNITED STATES PATENT OFFICE.

JOHN P. SMITH, OF NEW HAVEN, CONNECTICUT.

SNAG-HOOK.

No. 807,135.  Specification of Letters Patent.  Patented Dec. 12, 1905.

Application filed August 24, 1905. Serial No. 275,684.

*To all whom it may concern:*

Be it known that I, JOHN P. SMITH, a citizen of the United States, residing at New Haven, in the county of New Haven and State of Connecticut, have invented a new and useful Improvement in Snag-Hooks; and I do hereby declare the following, when taken in connection with the accompanying drawings and the numerals of reference marked thereon, to be a full, clear, and exact description of the same, and which said drawings constitute part of this specification, and represent, in—

Figure 1, a side view of a snag-hook constructed in accordance with my invention, a portion of the hooks and other wires broken away; Fig. 2, a vertical central section through the head portion of the hooks; Fig. 3, a sectional view on the line *a b* of Fig. 2; Fig. 4, a side view of one of the hook-wires detached; Fig. 5, a side view of a modified form of hook-wire.

This invention relates to an improvement in snag-hooks or combination of fish-hooks, and particularly to such as have a series of hooks depending from a head to which bait is attached, and so that if the bait is nibbled a sudden upward movement of the hooks will be apt to catch one or more fish; the object of the invention being a simple arrangement of parts whereby the hooks may be readily detached and renewed, as required; and the invention consists in the construction as hereinafter described and particularly recited in the claims.

In carrying out my invention I employ a head 2, which is preferably hollow and through which a stem 3 extends, the stem having an eye 4 at its upper end for attachment to a line and an eye 5 at its lower end for the attachment of a sinker. In the sides of the head are a series of holes or perforations 6 and at the lower end is a flange 7, having a series of notches 8. Connected with the head are a number of wires 9, corresponding to the number of holes in the head. These wires are of spring metal and have their upper ends 10 offset to pass through the hole 6. The wires then extend down through the notches 7, in which they are held by an encircling ring 11. Near the lower ends these wires have bends 12, and their extreme ends are bent to form open eyes 13. The fish-hooks 14 are of usual construction, including eyes 15, which are threaded over the wires 9 and so that the eyes 15 engage with the bends 12, while the shank of the hook is sprung into the open eyes 13, so that the hooks are rigidly connected with the wires 9, but may be readily disengaged therefrom when it is desired to remove them for the replacement of others. Around the head 2 is a bait-holder 16, which may be of any preferred form, and as herein shown it consists of a spiral coil of wire having a sharp point 17, the diameter of the spiral being larger than the diameter of the head, so that bait may be firmly engaged or attached thereto by twisting the spring into the bait.

The connection of the wires with the head as described permits the ready removal of them by the removal of the ring 11, whereby these wires may be replaced should occasion require; but, if desired, the wires may be permanently connected with the head.

While I prefer to form the wires 9 in single pieces, they may be formed in two parts, as shown in Fig. 5, in which the portion 18 corresponds to the upper end of the wires 9, while the portion 19 corresponds to the lower part of the wires 9, the two portions being connected by open eyes 20 and 21, formed at the respective ends of the portions in substantially the same way as the hooks 14 are engaged with the wires 9.

Having thus described my invention, what I claim as new, and desire to secure by Letters Patent, is—

1. The herein-described snag-hook comprising a head, wires connected therewith, said wires terminating at the outer ends with open eyes, and having shoulders formed above said eyes, and hooks having eyes engaged with said shoulders, and having their shanks engaged with said open eyes, substantially as described.

2. The herein-described snag-hook comprising a hollow head having perforations in its side walls, wires having bends at the upper ends to enter said perforations, a ring surrounding said wires and holding them in engagement with said head, and hooks connected with the outer ends of said wires, substantially as described.

3. The herein-described snag-hook comprising a hollow head, a stem passing through it, said head formed at its lower end with a notched flange, holes in the side of said head in line with said notches, wires passing through said notches and formed at the upper ends with bends which enter said holes, means for holding said wires in engagement with said head, and hooks connected with the outer ends of said wires, substantially as described.

In testimony whereof I have signed this specification in the presence of two subscribing witnesses.

JOHN P. SMITH.

Witnesses:
FRED C. EARLE,
J. H. SHUMWAY.